United States Patent
Kirchner

(10) Patent No.: US 12,120,467 B2
(45) Date of Patent: Oct. 15, 2024

(54) SYSTEM AND METHOD FOR IDENTIFYING A DEFINED OBJECT AND ALERTING A USER

(71) Applicant: Presien Pty Ltd., Eveleigh (AU)

(72) Inventor: Nathan Graham Edward Kirchner, Eveleigh (AU)

(73) Assignee: Presien Pty Ltd., Eveleigh (AU)

( * ) Notice: Subject to any disclaimer, the term of this patent is extended or adjusted under 35 U.S.C. 154(b) by 0 days.

(21) Appl. No.: 17/321,643

(22) Filed: May 17, 2021

(65) Prior Publication Data

US 2021/0272436 A1 Sep. 2, 2021

Related U.S. Application Data

(63) Continuation of application No. PCT/AU2019/051281, filed on Nov. 21, 2019.

(51) Int. Cl.

| | |
|---|---|
| *H04N 7/18* | (2006.01) |
| *G06F 18/25* | (2023.01) |
| *G06V 10/94* | (2022.01) |
| *G06V 20/52* | (2022.01) |
| *G08B 7/06* | (2006.01) |
| *G08B 21/02* | (2006.01) |
| *H04N 23/54* | (2023.01) |

(52) U.S. Cl.
CPC .............. *H04N 7/188* (2013.01); *G06F 18/25* (2023.01); *G06V 10/95* (2022.01); *G06V 20/52* (2022.01); *G08B 7/06* (2013.01); *G08B 21/02* (2013.01); *H04N 23/54* (2023.01)

(58) Field of Classification Search
CPC ........ G08B 21/02; G08B 7/06; G06K 9/6288; H04N 5/2253; H04N 7/188; H04N 7/18; H04N 23/25; G06V 10/95; G06V 20/52; G06V 20/00; A61B 2562/04; A61B 2562/046; G06F 18/25
USPC ......... 382/100, 103; 348/143, 152, 153, 159
See application file for complete search history.

(56) References Cited

U.S. PATENT DOCUMENTS

| | | | |
|---|---|---|---|
| 9,365,155 B2 | 6/2016 | Hathaway et al. | |
| 2007/0126869 A1* | 6/2007 | Montminy | H04N 23/60 348/E5.042 |
| 2009/0201143 A1 | 8/2009 | McKenna et al. | |

(Continued)

FOREIGN PATENT DOCUMENTS

| | | |
|---|---|---|
| JP | 3170021 U | 9/2011 |
| JP | 2017146930 A | 8/2017 |
| WO | 2018152475 A1 | 8/2018 |

*Primary Examiner* — Brian Wilson
(74) *Attorney, Agent, or Firm* — SLEMAN & LUND LLP

(57) ABSTRACT

Systems for identifying one or more defined objects and alerting a user, and components of such systems. The system includes: a plurality of sensors configured to sense environmental information within a defined range; a plurality of alert devices configured to emit an alert; and a communications module communicatively connected to the sensors, the devices, and one or more processors configured to assess sensed environmental information to identify the one or more defined objects. The communications module is configured so that responsive to communicating with the sensors, the one or more processors, and the alert devices, the module communicates an alert signal to each alert device registered with a sensing zone to cause each registered alert device to emit the alert.

14 Claims, 9 Drawing Sheets

(56) References Cited

U.S. PATENT DOCUMENTS

| | | |
|---|---|---|
| 2014/0376405 A1 | 12/2014 | Erickson et al. |
| 2015/0091716 A1 | 4/2015 | Hathaway et al. |
| 2015/0266472 A1 | 9/2015 | Ferguson et al. |
| 2015/0381947 A1 | 12/2015 | Renkis |
| 2017/0265124 A1* | 9/2017 | Seemann ................ H04W 4/70 |
| 2018/0247505 A1 | 8/2018 | Arai et al. |
| 2018/0293864 A1 | 10/2018 | Wedig et al. |
| 2019/0035242 A1* | 1/2019 | Vazirani ........... G08B 13/19695 |

\* cited by examiner

SYSTEM AND METHOD FOR IDENTIFYING A DEFINED OBJECT AND ALERTING A USER

CROSS-REFERENCE TO RELATED APPLICATIONS

This application is a continuation of International Application No. PCT/AU2019/051281, filed Nov. 21, 2019, and claims priority to Australian Application No. 2018904451, filed Nov. 22, 2018, the contents of both are incorporated by reference as if fully set forth herein.

TECHNICAL FIELD

The present disclosure relates generally to systems and methods for identifying one or more defined objects, such as a person and/or a vehicle, and alerting a user, so that the user is aware of the presence of the one or more objects.

BACKGROUND

In many scenarios, it is useful to rapidly identify a defined object and alert a user to prompt an action to be taken by the user. For example, on construction or railway sites, workers and high-value equipment are often at risk of being damaged during use, which can cause injury, death and/or incur significant costs. To mitigate this risk, a person is often employed as a 'spotter' to manually identify high risk situations and take action to prevent damage and/or injury.

Automated systems for identifying objects are known and employed for a range of purposes. One example of such a system is described in U.S. Pat. No. 8,588,527 which involves identifying an object shown in an image captured by a camera-equipped smart phone and deriving search terms relating to the object, thereby allowing a search query to be generated and executed using the search terms to identify information relevant to the identified object. Whilst this system appears to be an effective tool for identifying an object, in practice, such systems often fail or inaccurately identify the object as the operating conditions necessary for the system to operate effectively are typically very restrictive. For example, the orientation and/or position of the camera relative to the object, and/or lighting or other environmental conditions proximal to the object, can significantly affect accuracy of such a system.

Moreover, relevant prior art approaches to automate identifying objects often require complex and expensive equipment, such as multiple and/or complex sensors and computer processors, to achieve accurate results.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

According to some disclosed embodiments, there is provided a system for identifying one or more defined objects and alerting a user, the system comprising a plurality of sensors, each sensor configured to sense environmental information within a defined range, a plurality of alert devices, each alert device configured to emit an alert, and a communications module communicatively connected to the plurality of sensors, the plurality of alert devices, and one or more processors, each processor configured to assess sensed environmental information to identify the one or more defined objects, the communications module configured so that responsive to communicating with the sensors, receiving, from the one or more processors, data relating to a sensing zone defined by the range of at least one of the sensors, responsive to communicating with the alert devices, receiving, from the one or more processors, data relating to at least one alert device being registered with the sensing zone, responsive to communicating with the at least one sensor associated with the sensing zone to receive sensed environmental information, receiving, from the one or more processors, an alert signal confirming whether the one or more defined objects are within the sensing zone, and communicating the alert signal to each alert device registered with the sensing zone to cause each registered alert device to emit the alert.

The communications module may be configured to communicate with the sensors to allow the one or more processors to determine at least one of: which of the sensors are authorised to be associated with the sensing zone; and which of the sensors are less than a first defined distance away from the communications module, thereby allowing the sensing zone to be determined by the one or more processors.

The communications module is configured communicate with the alert devices to allow the one or more processors to determine at least one of: which of the alert devices are authorised to register with the sensing zone; and which of the alert devices are less than a second defined distance away from the communications module, thereby allowing registration of the at least one alert device with the sensing zone to be determined by the one or more processors.

At least one of the sensors, the alert devices and the communications module may be movable relative to each other.

The communications module and at least one of the sensors may be movable relative to each other, and the communications module be configured to continuously or periodically facilitate communication between the at least one of the sensors and the one or more processors to allow the sensing zone to be reconfigured responsive to confirming which of the sensors are less than a third defined distance away from the communications module.

The communications module and at least one of the alert devices may be movable relative to each other, and the communications module be configured to continuously or periodically facilitate communication between the at least one of the alert devices and the one or more processors to allow registration of alert devices with the sensing zone to be re-determined responsive to confirming which of the alert devices are less than a fourth defined distance away from the communications module.

The system may include at least one further alert device and a further communications module in communication with the at least one further alert device and the one or more processors, wherein the further communications module is configured so that responsive to communicating with the at least one further alert device, receiving, from the one or more processors, data relating to the, or each, further alert device being registered with the sensing zone, and receiving, from the one or more processors, an alert signal confirming whether the one or more defined objects are within the sensing zone, and communicating the alert signal to the, or each, further alert device registered with the sensing zone to cause the, or each, registered further alert device to emit the alert.

The system may include a further communications module in communication with the sensors, the alert devices and the one or more processors, wherein the further communications module is configured so that responsive to communicating with the sensors, receiving, from the one or more processors, data relating to a further sensing zone defined by the range of at least one of the sensors, responsive to communicating with the alert devices, receiving, from the one or more processors, data relating at least one alert device being registered with the further sensing zone, and responsive to communicating with the at least one sensor associated with the further sensing zone to receive sensed environmental information, receiving, from the one or more processors, an alert signal confirming whether the one or more defined objects are within the further sensing zone, and communicating the alert signal to each alert device registered with the further sensing zone to cause each registered alert device to emit the alert.

At least one of the alert devices may be movable relative to both communications modules and configured to cause registration with the sensing zone associated with the most closely located communications module. The at least one of the alert devices may be further configured to require authorisation from the user before registration with any sensing zone.

At least one of the sensors may be movable relative to both communications modules and configured to cause association with the sensing zone associated with the most closely located communications module, thereby increasing a collective range of the sensors associated with the sensing zone.

The system may also include a controller communicatively connected to the one or more processors, the controller being operable, by the user, to define the one or more defined objects and associate the one or more defined objects with at least one of the sensing zones.

The controller may be operable to associate one or more first defined objects with the sensing zone, and one or more second defined objects with the further sensing zone. Also, the communications module may be configured to receive, from the controller, data relating to alert device configuration and communicate the data to the at least one alert device registered with the sensing zone to cause emitting a first alert, and communicate the data to the at least one alert device registered with the further sensing zone to cause emitting a second alert, and wherein the first alert and the second alert are discernible from each other by the user.

The controller may be operable to configure either sensing zone to define an area of less than the range of the one or more sensors associated with that sensing zone.

According to other disclosed embodiments, there is provided a system for identifying one or more defined objects and alerting a user, the system comprising a plurality of sensors, each sensor configured to sense environmental information within a defined range, a plurality of alert devices, each alert device configured to emit an alert, and a processor configured to assess sensed environmental information to identify the one or more defined objects, the processor including a communications module communicatively connected to the plurality of sensors and the plurality of alert devices, the processor being configured so that responsive to communicating, via the communications module, with the sensors, the processor determines a sensing zone defined by the range of at least one of the sensors, responsive to communicating, via the communications module, with the alert devices, the processor determines at least one alert device to register with the sensing zone, responsive to receiving sensed environmental information detected by the at least one sensor associated with the sensing zone, the processor determines whether the one or more defined objects are within the sensing zone, and responsive to identifying the one or more defined objects within the sensing zone, the processor communicates, via the communications module, with each alert device registered with the sensing zone to cause each registered alert device to emit the alert.

According to other disclosed embodiments, there is provided a method for identifying one or more defined objects with one or more processors and alerting a user, the method including communicating, by the one or more processors, with a plurality of sensors to determine a sensing zone, communicating, by the one or more processors, with a plurality of alert devices to determine at least one alert device to register with the sensing zone, sensing, with a plurality of sensors, environmental information relating to the sensing zone, and communicating the sensed environmental information to the one or more processors, determining, by the one or more processors, whether the one or more defined objects are within the sensing zone, communicating, by the one or more processors, an alert signal to each alert device registered with the sensing zone, and emitting, by each registered alert device, an alert.

According to other disclosed embodiments, there is provided a sensor for sensing environmental information, the sensor comprising a sensing unit defining a detection range within which the environmental information is sensed, a memory store storing identification and authorisation information, a processor communicatively connected to the memory store, and a communications module configured to communicate sensed environmental information, the identification information and the authorisation information.

According to other disclosed embodiments, there is provided an alert device for communicating an alert to a user, the alert device comprising an alert generator configured to cause the alert to be emitted, a memory store storing identification and authorisation information, a processor communicatively connected to the memory store, and a communications module configured to communicate the identification information and the authorisation information, and receive an alert signal to cause operation of the alert generator to emit the alert.

The alert generator may include one or more of a light and a vibrator, and further including a releasable strap to allow securement around a limb of the user.

The alert generator may include at least one electrical connector configured to connect to an electrical circuit, thereby allowing the alert device to control another device.

According to other disclosed embodiments, there is provided a mount assembly for mounting a camera to a structure, the assembly comprising a plurality of bases, each base configured to be releasably secured to the structure, and each base defining a first bayonet fitting, and an arm including a base connector defining a second bayonet fitting configured to engage the first bayonet fitting, a camera connector configured to engage the camera, the camera connector being movable relative to the base connector, and a locking mechanism for releasably securing the base connector and the camera connector in position relative to each other.

One of the first bayonet fitting and the second bayonet fitting may define a shaft having at least one flange extending away from the shaft, and the other bayonet fitting may define a recess shaped to receive the at least one flange and allow at least partial rotation of the flange about an axis of the shaft, and further defining an aperture into the recess, the aperture shaped to allow the at least one flange and the shaft to pass into the recess.

The at least one flange may comprise a pair of oppositely extending flanges.

The plurality of bases may include a first base having a flange extending away from the first bayonet fitting, the flange defining a plurality of apertures configured to receive one or more fasteners.

The plurality of bases may include a second base including at least one magnetic element integrally formed with or connected thereto, the at least one magnetic element arranged to draw the second base towards the surface.

The plurality of bases may include a third base including a pipe clamp, the pipe clamp including a pair of opposable jaws and an actuator operable to urge the jaws towards each other.

The camera connector may include a third bayonet fitting defining a shaft having a pair of opposed flanges extending away from the shaft.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompany drawings in which.

DESCRIPTION OF EMBODIMENTS

Figure 1:
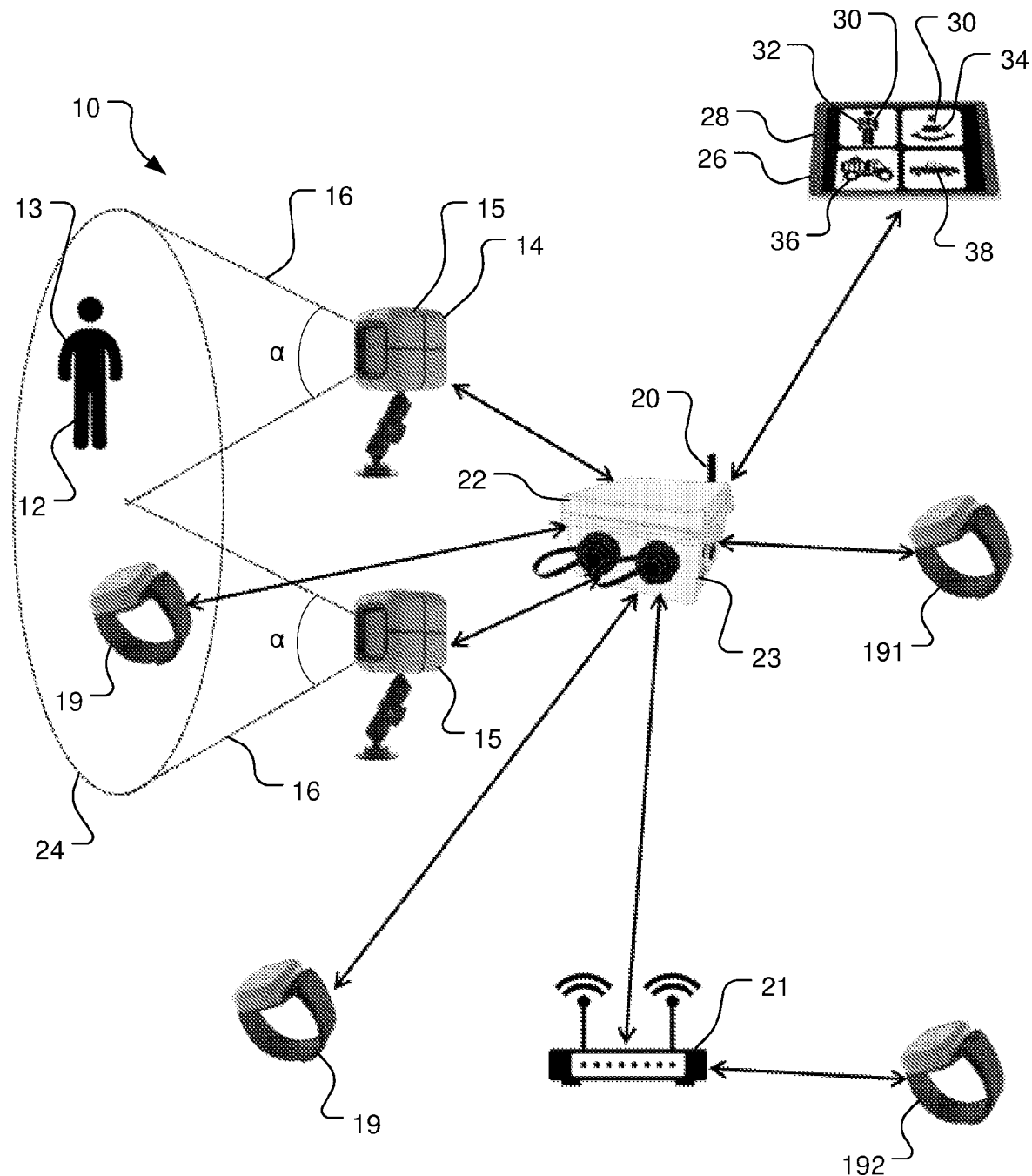
FIG. 1 is a plan view diagram of a system for identifying one or more defined objects and alerting at least one user.

In the drawings, reference numeral 10 generally designates a system 10 for identifying one or more defined objects 12 and alerting a user. The system 10 includes a plurality of sensors 14, each sensor 14 being configured to sense environmental information within a defined range 16, a plurality of alert devices 18, each alert device 18 associated with a user and configured to emit an alert, and a communications module 20 communicatively connected to the plurality of sensors 14, the plurality of alert devices 18, and one or more processors 22 configured to assess sensed environmental information to identify the one or more defined objects 12. The communications module 20 is configured so that: responsive to communicating with the sensors 14, the module 20 receives, from the one or more processors 22, data relating to a sensing zone 24 defined by the range 16 of at least one of the sensors 14; and responsive to communicating with the alert devices 18, the module 20 receives, from the one or more processors 22, data relating to at least one alert device 18 being registered with the sensing zone 24; and responsive to communicating with the at least one sensor 14 associated with the sensing zone 24 to receive sensed environmental information, the module 20 receives, from one or more processors 22, an alert signal confirming whether the one or more defined objects 12 are within the sensing zone 24, and communicates the alert signal to each alert device 18 registered with the sensing zone 24 to cause each registered alert device 18 to emit the alert.

FIG. 1 shows a plan view diagram of the system 10 in which double-headed arrows illustrate communication channels between components of the system 10. The illustrated embodiment of the system 10 includes a controller 26, a processing unit 23 housing at least one processor 22 and the communications module 20, a further, non-local communications module 20, in the form of a wireless router 21, two sensors 14, in the form of video cameras 15, and four alert devices 18, in the form of wrist-watch style wearable devices 19.

The controller 26 provides an interface to allow an operator to manually configure functionality of the system 10, including configuring functionality of one or more of the sensors 14, the alert devices 18, the processing unit 22 and the communications module 20. The controller 26 is typically configured as a human-machine interface (HMI) application executed by a computing device, in this embodiment in the form of a tablet computer 28.

The controller 26 allows the operator to define the one or more defined objects 12 by operating interface elements which represent the one or more defined objects. In the embodiment shown, the interface elements are icons 30 displayed on a touchscreen of the tablet 28. Each icon 30 represents a detection class, being a category of similar objects 12. In the illustrated embodiment, the icons 30 represent the following detection classes: people 32, site management equipment 34, heavy machinery 34, and road vehicles 36. It will be appreciated that the controller 26 may be alternatively embodied such as in an electrical-mechanical device comprising interface elements configured as buttons, levers, switches, dials and the like.

The controller 26 is communicatively connected to at least the communications module 20 to communicate which object(s) 12 the operator has defined to the processor 22. This consequently dictates which object(s) 12 the processor 22 will attempt to identify within the sensing zone 24. In the illustrated embodiment the controller 26 has been operated to select the people 32 detection class, meaning that, responsive to receiving sensed environmental information, from the cameras 15, relating to the sensing zone 24, the processor 22 assesses the information to determine whether any people 32 are present within the sensing zone 24. As illustrated, a person 13 is within the sensing zone 24, causing the processor 22 to send an alert signal, via the communications modules 20, 21, to each alert device 191, 192 registered with the sensing zone, causing these alert devices 191, 192, to emit an alert.

The processing unit 23 includes the at least one processor (22—not illustrated) and at least one memory store (not illustrated). The processing unit 23 is shown positioned locally to the cameras 15 to allow sensed environmental information to be processed in situ to the sensing zone 24 (known as 'edge computing'). It will be appreciated that processing may occur remotely from the cameras 15 (and any other component of the system 10), such as by one or more processors 22 hosted remotely on a local area network (known as 'fog computing') and/or the Internet (known as 'cloud computing'). Where the processor(s) 22 are hosted remotely from the cameras 15, it will be appreciated that the processing unit 23 is substituted with only the communications module 20 which allows the processor(s) 22 to communicate with other components of the system 10. It will also be appreciated that processing may occur as a combination of local and remote processing, such as by the processing unit 23 and Internet hosted processor(s) 22. For example, the system 10 may be configured to continuously or periodically switch between local and/or remote processing depending on determined factors, such as computational requirements for processing and/or connectivity of the processing unit 23 and remote processor 22 to the system 10 components, such as the cameras 15.

The system 10 is configured to identify the one or more defined objects 12 in accordance with any of the methods disclosed in international patent application no. PCT/AU2018/050095 entitled "System for identifying a defined object", filed on 8 Feb. 2018. This includes the system 10 being trained, via multiple training processes and/or a feedback loop, to define a range of different objects 12, as disclosed in this application.

The communications module 20 is configured to facilitate communication between the processing unit 23 and any component of the system 10, and may be configured to facilitate communication between any component of the system 10. This typically involves facilitating wireless communication via a radio frequency, such as using a "Wi-Fi", "XBee" or "ZigBee" communication protocol. Where the processor(s) 22 is remotely located, the communications module 20 is connected to the processor(s) 22 via the Internet. In this scenario, the communications module 20 may be configured as a stand-alone unit, such as the wireless router 21, and/or as a dongle connectable to an Internet connection, such as a USB dongle connectable to a laptop computer or mobile phone.

As shown in FIG. 1, the system 10 may comprise multiple communications modules 20, 21, allowing communication between the processor(s) 22 and at least the alert devices 18 to be spread across a wide territory. For example, the communications module 20 housed in the processing unit 23 may be configured to communicate with alert devices 19 positioned locally to the processing unit 23, whereas the communications module configured as the router 21 may be remotely located from the processing unit 23 to communicate with alert devices 19 positioned locally to the router 21. This arrangement can be useful to communicate an alert to users located remotely from the sensing zone 24. For example, if the sensing zone 24 is arranged across a loading bay at a dockyard, it may be useful to alert workers located in a warehouse to the presence of the defined object(s) 12 in the loading bay, therefore preparing the workers to receive the defined object(s) 12 in the warehouse within a predictable timeframe.

The illustrated embodiment includes two cameras 15 and four wearable alert devices 19. It will be appreciated that the number and type of sensors 14 and alert devices 18 shown in FIG. 1 is exemplary and, alternatively, the system 10 may include virtually any number of sensors 14 and alert devices 18, and the sensors 14 and alert devices 18 may be alternatively configured. For example, at least one of the sensors 12 may be substituted for an infrared sensor or a proximity sensor.

Each sensor 14 is configured to sense environmental information within the defined range 16. In the embodiment shown, the range 16 is limited by a field of view of each camera 14 defined by a rectangular based pyramid/frustum having an angular size (a), typically being around 110 degrees. The camera 14 is operable to record video footage of events occurring within the range 16.

Each camera 15 typically includes a processor (not shown) and a memory store (not shown). The memory store defines at least one of an identification (ID) code and/or authorisation information specific to the camera 14. Each camera 15 is configured to communicate with the communications module 20 to communicate any of the footage, ID code and authorisation information to the processing unit 23.

Where the system 10 is configured to operate a single sensor 14, the range 16 of that sensor 14 defines the sensing zone 24, being the region (area or volume) which the system 10 is configured to monitor to identify the one or more defined objects 12. As shown in FIG. 1, the system 10 is configurable to include multiple sensors 14, such as the two cameras 15. Where multiple sensors 14 are employed, the range 16 of each sensor 14 in communication with the communications module 20 may be accumulated to form a collective range which defines a maximum size of the sensing zone 24. Whilst the sensing zone 24 is illustrated as defining an elliptical boundary, it will be appreciated that the boundary of the sensing zone 24 may define a different shape, such as a rectangle defined by an intersection of the view pyramid/frustum of each camera 15 and one or more surfaces, such as a floor and/or wall. Also, an operator, operating the controller 26, may manually define the boundary of the sensing zone 24 to be less than the maximum size able to be accessed via the range 16 of the cameras 15. This allows the operator to establish specific a shape and/or dimensions of the sensing zone 24.

Responsive to communicating with the cameras 15, via the communications module 20, the processor 22 may determine the sensing zone 24 by assessing each camera 15 ID code, the authorisation information, and/or any applicable rules defined in the memory store of the processing unit 23. For example, responsive to receiving a "hello" ping from a camera 15, the processor 22 may compare the ID code to a rule to determine whether the camera 15 is permitted, by the rule, to be used to form the sensing zone 24. Alternatively or additionally, the processor 22 may assess the authorisation information to determine if the camera 15 is authorised to form the sensing zone 24. If the camera 15 is permitted/authorised, the processor 22 may then determine if a distance of the camera 15 away from the communications module 20 (determined, for example, by assessing radio frequency signal strength) is less than a defined threshold. Where all requirement(s) of each relevant rule are satisfied, the processor 22 assigns the camera 15 to the sensing zone 24, meaning that the range 16 of the camera 15 either defines the sensing zone 24 or is accumulated with the range 16 of one or more other cameras 15 already assigned to the sensing zone 24.

Each alert device 18 is configured to emit an alert to make the user aware that the system 10 has identified the one or more defined objects. The alert device 18 is configurable to directly alert the user, such as by the wearable alert device 19 emitting one or more of vibration, sound and light, or indirectly alert the user by operating another device, such as a traffic light (FIG. 4, 7), variable message sign/system (VMS), klaxon, beacon or the like. It will be appreciated that the alert device 18 may be integrated with a further device to provide the alert. For example, the alert device 18 may be configured as a controller (not illustrated) and integrated within an engine management control system, whereby the alert device 18 causes the associated engine to cease operation to emit the alert to the user.

In the embodiment shown, the wearable alert device 19 includes a vibrator (not illustrated) and a light 178 (FIG. 13) and is configured to operate at least one of these to emit the alert. The device 19 also includes one or more electrical connections 183 (FIG. 16) for direct signals integration to allow the device 19 to connect to and operate another electronic device. For example, the device 19 may be secured in a fixed position and connected to a set of traffic lights or a VMS, whereby operating the connectors 183 switches the traffic lights on/off, or illuminates one of a range of messages displayed by the VMS.

Each alert device 18 typically includes a processor (not shown) and a memory store (not shown). The memory store defines at least one of an identification (ID) code and authorisation information specific to the alert device 18. Each alert device 18 is configured to communicate with the communications module 20 to communicate the ID code and/or authorisation information to the processor 22.

Responsive to communicating with the alert devices 19, via the communications module 20, the processor 22 may determine which alert device(s) 19 to register with the sensing zone 24 by assessing each alert device 19 ID code, authorisation information, and/or any relevant rules defined in the memory store of the processing unit 22. For example, responsive to receiving a "hello" ping from an alert device 191, the processor 22 may compare the ID code to a rule to determine whether the alert device 191 is permitted, by the rule, to register to the sensing zone 24. Alternatively or additionally, the processing unit 22 may assess the authorisation information to determine if the associated alert device 191 is authorised to register with the sensing zone 24. If the alert device 191 is permitted/authorised, the processing unit 22 may then determine if a distance of the alert device 191 away from the communications module 20 (determined, for example, by assessing radio frequency signal strength) is less than a defined threshold. Where all requirement(s) of each relevant rule are satisfied, the processor 22 registers the alert device 191 with the sensing zone 24. This means that, responsive to the processor 22 identifying the one or more defined objects in the sensing zone 24, the alert device 191 receives the alert signal associated with the sensing zone 24 causing the alert device 191 to emit the alert.

Each alert device 19 may be configured, by one or more rules stored in the associated memory store, to require manual authorisation to be provided by a user, prior to registering with the sensing zone 24. For example, should the processor 22 determine that an alert device 19 complies with each relevant rule and is allowed to register with the sensing zone 24, and communicate this, via the communications module 20, to the alert device 19, this may cause the alert device 19 to seek manual authorisation, such as emitting a specific vibration pattern to prompt the user to press a connectivity button 181 (FIG. 16) to confirm authorisation.

Figure 2:
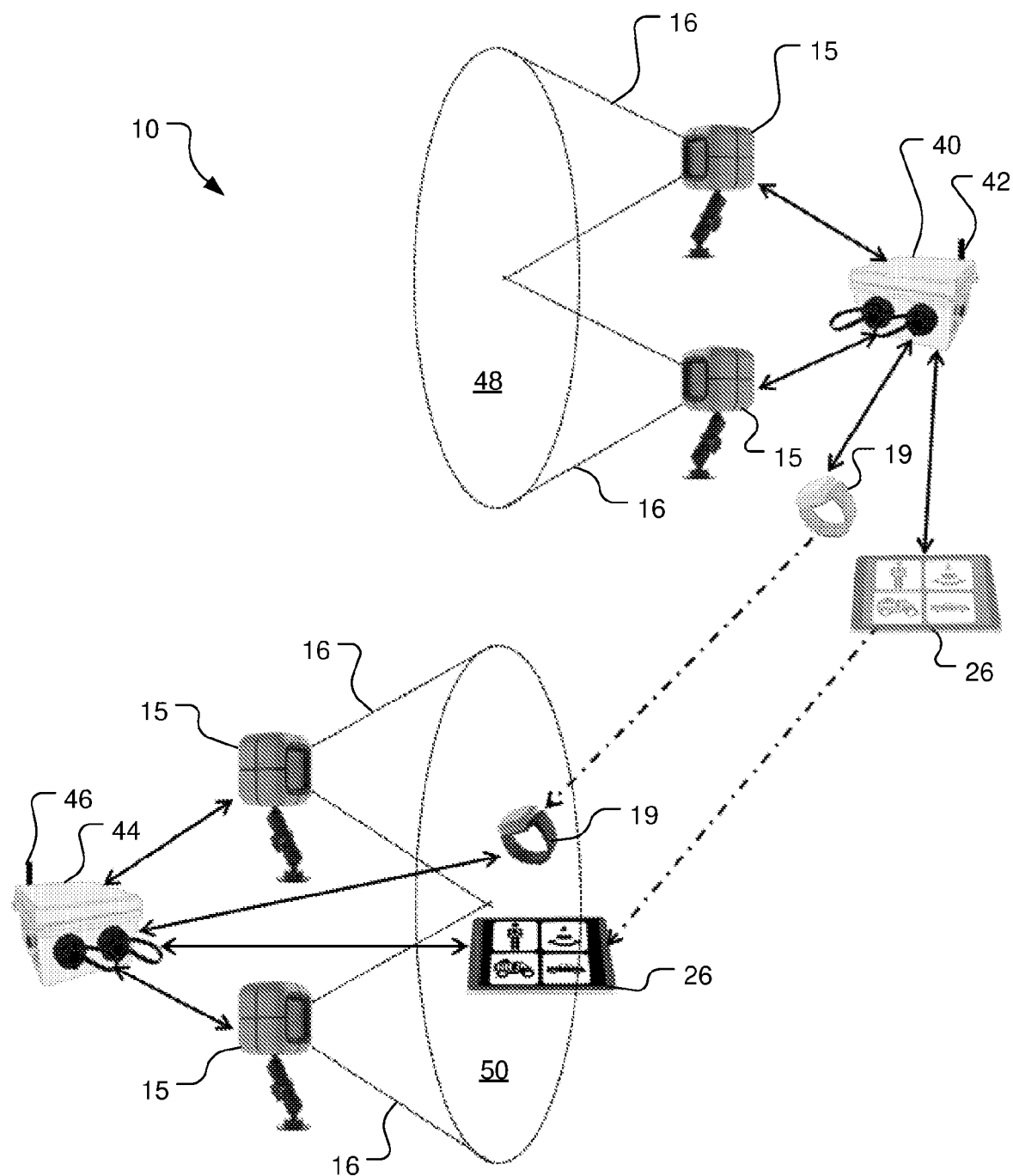
FIG. 2 is a plan view diagram of an alternative configuration of the system shown in FIG. 1.

FIG. 2 shows a plan view diagram of an alternative configuration of the system 10 comprising two processing units 40, 44 and associated communications modules 42, 46. However it will be appreciated that this embodiment may not include two processing units 40, 44 and instead, be configured to that one or more remotely located processors 22 are in communication with each communications module 42, 46.

Each communications module 42, 46 is secured relative to, and is in communication with, two cameras 15. The collective range of the two cameras 15 define one of the sensing zones 48, 50. Due to the positions of the cameras 15 relative to each other, the sensing zones 48, 50 are spaced apart.

The system 10 configuration shown in FIG. 2 includes a single alert device 19 and the controller 26. The single-ended dashed arrows illustrate movement of the alert device 19 and the controller 26 from near one sensing zone 48 to within the other sensing zone 50.

The alert device 19 is initially registered by the processing unit 40 with a first sensing zone 48 meaning that the device 19 receives the alert signal associated with the first zone 48, causing the device 19 to emit the alert. The alert device 19 then moves into a second sensing zone 50 causing the processing unit 44 to deregister the device 19 with the first sensing zone 48 and register the device 19 with the second sensing zone 50, meaning that the device 19 receives the alert signal associated with the second zone 50, causing the device 19 to emit the alert.

For example, the first sensing zone 48 may be arranged around a rear of an excavator and the processing unit 40 be configured to identify people in the zone 48. The second sensing zone may be arranged around an amenities block and the processing unit 44 be configured to identify heavy machinery. In this scenario, the alert device 18 may be worn by a driver of the excavator so that the driver is alerted to the presence of people near the rear of the excavator, allowing the driver to avoid driving the excavator into the people. The driver may then leave the excavator to enter the amenities block and, due to the device 19 entering and registering with the second zone 50, the driver is alerted to any machinery entering the second zone 50, allowing the driver to avoid being hit by the machinery, potentially enhancing safety of the driver.

The controller 26 is configurable to register with either sensing zone 48, 50 in the same way as the alert devices 18. Registering with a sensing zone 48, 50 may cause the processing unit 40, 44 to adjust the defined object(s) 12 which the processing unit 40, 44 is attempting to identify in the zone 48, 50.

For example, the controller 26 may be carried by an operator wearing an orange vest and be configured so that persons wearing an orange vest are imported as an additional defined object 12 when the controller 26 registers with a sensing zone 48, 50. In this scenario, when the controller 26 is initially registered with the first sensing zone 48 this does not affect the objects 12 being identified by the processing unit 40 in the zone 48 (due to already being configured to identify all persons). When the controller 26 moves into and registers with the second sensing zone 50, this reconfigures the processing unit 44 to identify any heavy machinery and persons wearing an orange vest. This means that an alert signal will be communicated to the alert devices 19 registered with the second zone 50 when the operator (wearing the orange vest) is present in the second zone 50, potentially enhancing safety of the operator.

Figure 3:
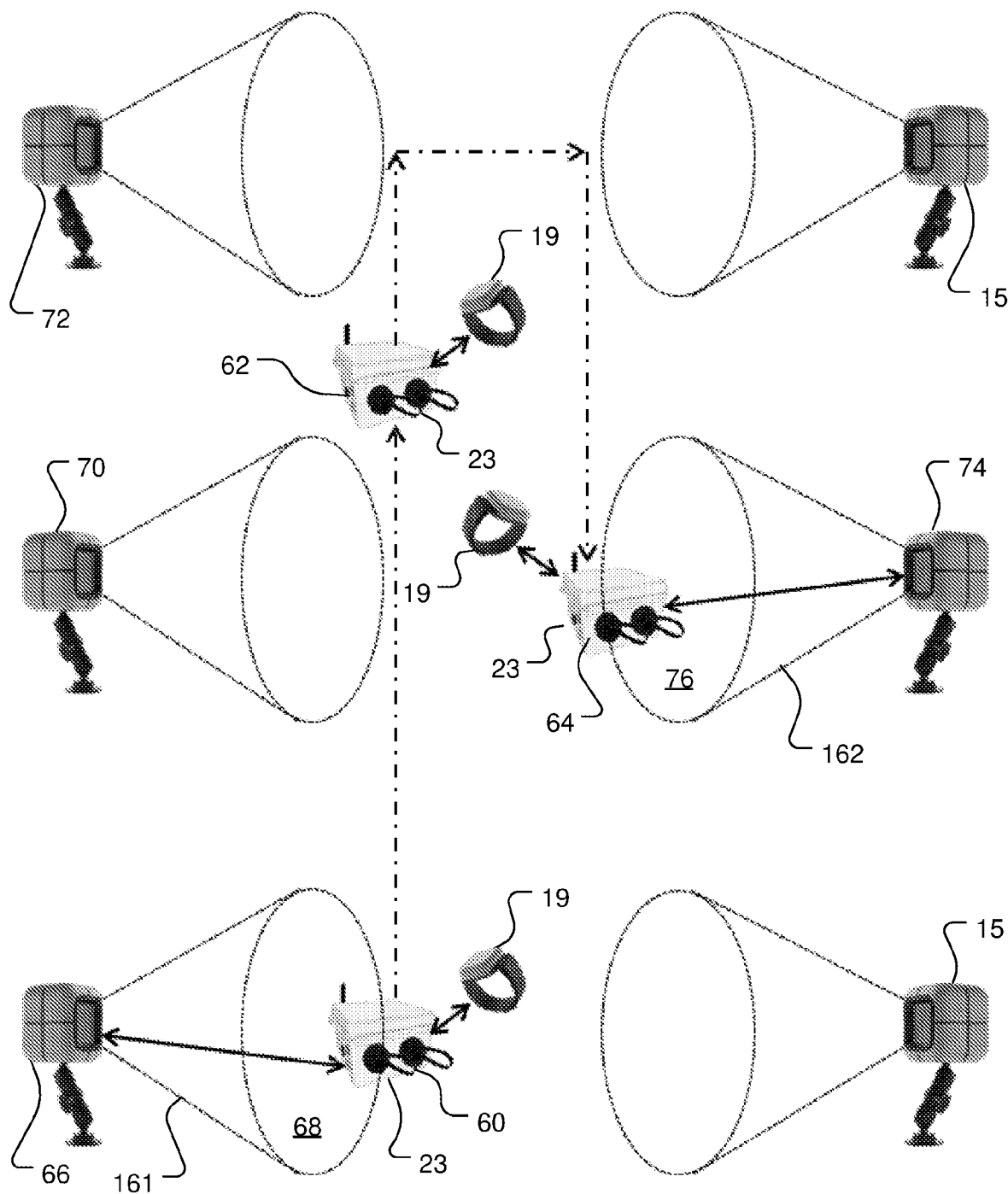
FIG. 3 is a plan view diagram of a further alternative configuration of the system shown in FIG. 1.

FIG. 3 is a plan view diagram of a further alternative configuration of the system 10 including six cameras 14, each being secured in a fixed position. In this configuration the processing unit 23 and communications module 20 are movable relative to the cameras 14. The single-headed dashed arrows illustrate a motion path of the processing unit 23. A single alert device 19 is shown in communication and moving with the processing unit 23. Again, it will be appreciated that processing of sensed information may occur remotely, such as by one or more processors 22 hosted on the Internet, and in communication with the system 10 components via the communications module 20, and therefore the processing unit 23 may be substituted by only the communications module 20.

The processing unit 23 is illustrated in three positions 60, 62, 64. In the first position 60, the communications module 20 communicates with a first camera 66 to allow the processor 22 to determine, due to the distance of the first camera 66 away from the communications module 20 being less than a defined threshold (in the illustrated embodiment, the distance threshold being equal to the range 16 of the camera 66), that the range 161 of the first camera 66 defines a first sensing zone 68. Consequently, whilst moving relative to the camera 66 within the first zone 68, the processor 22 monitors the first zone 68 for the presence of the defined object(s) 12 and, if the object(s) 12 are identified, communicates an alert signal to the alert device 19.

In the second position 62, the communications module 20 communicates with a second camera 70 and a third camera 72 to allow the processor 22 to determine, due to the distance of the second and third cameras 70, 72 away from the communications module 20 being more than the defined threshold, that neither camera 70, 72 can be utilised to form a sensing zone.

In the third position 64, the communications module 20 communicates with a fourth camera 74 to allow the processor 22 to determine, due to the distance of the fourth camera 74 away from the communications module 20 being less than the defined threshold, that the range 162 of the fourth camera 74 defines a second sensing zone 76. Consequently, whilst moving relative to the camera 74 within the second zone 76, the processor 22 monitors the second zone 76 for the presence of the defined object(s) 12 and, if the object(s) 12 are identified, communicates an alert signal to the alert device 19.

Operating in this way allows a sensing zone to be temporarily generated locally to the communications module 20. This means that as the communications module 20 moves, this affects when an alert signal may be generated and communicated to the alert device 19, and therefore when a user is alerted. This is useful should the communications module 20 be secured to a portable structure, such as a vehicle, and the cameras 14 be secured around a large area, such as a warehouse. In this example, this allows the system 10 to successively monitor defined regions during transit of the communications module 20 through the warehouse and generate the alert responsive to conditions in each region.

Figure 4:
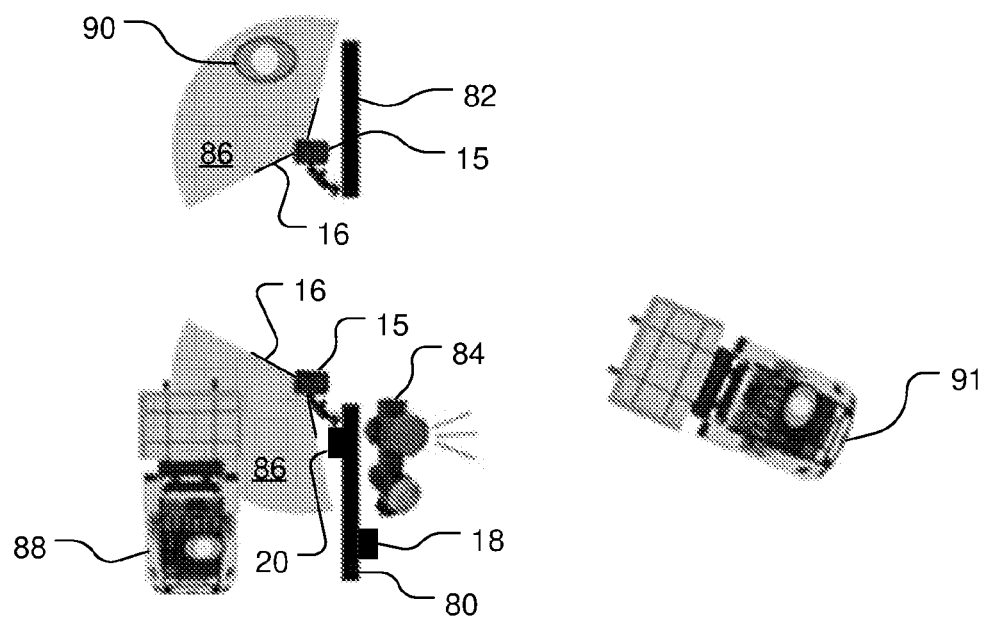
FIG. 4 is a plan view diagram illustrating a use case for the system shown in FIG. 1.

FIG. 4 is a plan view of a use case for the system 10 installed at a high traffic intersection, for example, in a warehouse or a construction site, to identify objects 88, 90 in two blind spots. In this embodiment, the system 10 includes the communications module 20 in communication with a remotely located processor 22 (not illustrated), the module 20 associated with one of two cameras 15 secured to two walls 80, 82 flanking the intersection, and also in communication with an alert device 18 secured to one of the walls 80 and operationally connected to a traffic light 84. The range 16 of each camera 15 is directed away from the traffic light 84. The processor 22 is configured so that the defined object categories 12 are vehicles and people. Responsive to communicating with the cameras 15, via the communications module 20, the processor 22 has determined the collective range of both cameras 15 define a sensing zone 86. Responsive to communicating with the alert device 18, the processor 22 has registered the device 18 with the sensing zone 86.

As shown in FIG. 4, when a forklift 88 and/or a person 90 are within the sensing zone 86, the processor 22 identifies these as the defined objects, causing the processor 22 to communicate an alert signal, via the communications module 20, to the alert device 18. The alert device 18 consequently operates one or more of the electrical connections 183 to control operation of the traffic light 84. This signals to a driver of another forklift 91 to cease driving through the intersection, reducing the risk of the forklift 91 colliding with the person 90 and/or the forklift 88.

Figure 5:
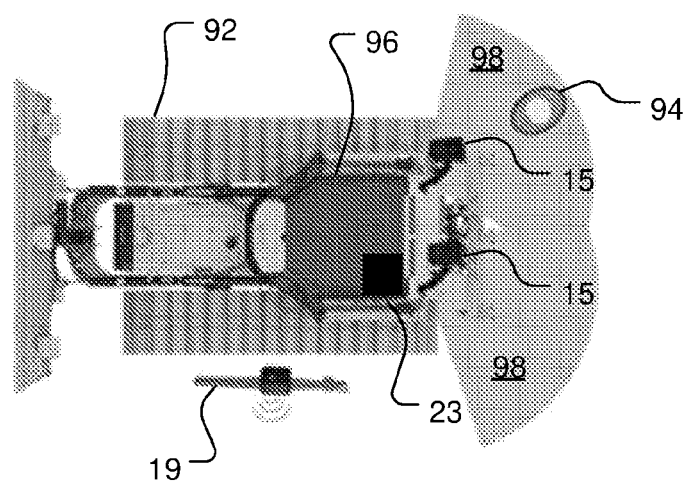
FIG. 5 is a plan view diagram illustrating an alternative use case of the system shown in FIG. 1.

FIG. 5 is a plan view of another use case for the system 10 installed on a bulldozer 92 to identify objects 94 in a blind spot. In this embodiment, the system 10 includes the processing unit 23, including the communications module 20, secured within the cab 96 of the bulldozer 92, two cameras 15 secured to the rear of the bulldozer 92 and in communication with the processing unit 23, and an alert device 19 worn by a driver of the bulldozer 92, the device in communication with the processing unit 23. The range 16 of the cameras 15 are directed away from the rear corners of the bulldozer 92. The processor 22 is configured so that the defined object category 12 is people. Responsive to communicating with the cameras 15, via the communications module 20, the processor 22 has determined the collective range of both cameras 15 define a sensing zone 98 extending across the entire rear end of the bulldozer 92. Responsive to communicating with the alert device 19, the processor 22 has registered the device 19 with the sensing zone 98.

As shown in FIG. 5, when a person 94 is within the sensing zone 98, the processor 22 identifies the person 94 as the defined object, causing the processor 22 to communicate an alert signal, via the communications module 20, to the alert device 19. The alert device 19 consequently emits a vibration pattern to signal to the driver of the bulldozer 92 to cease driving, reducing the risk of the bulldozer 92 colliding with the person 94.

Figure 6:
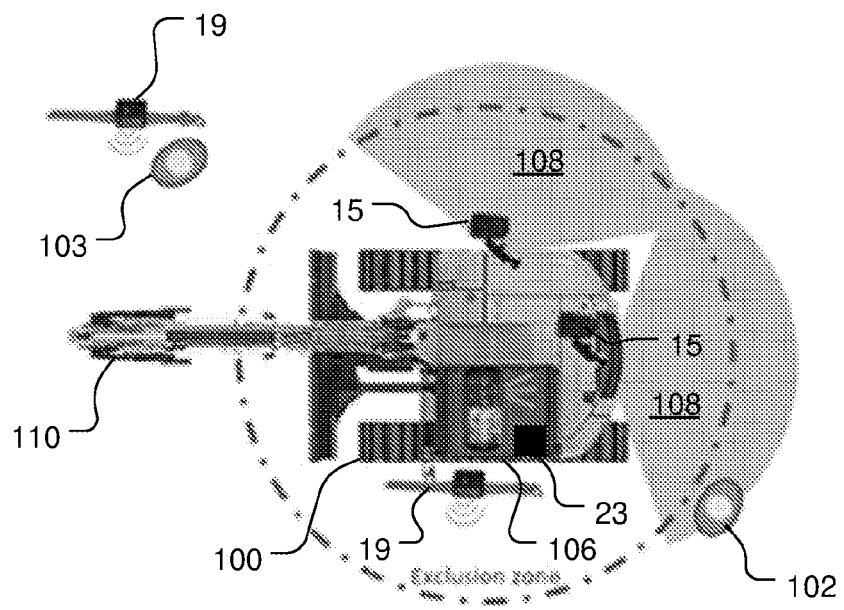
FIG. 6 is a plan view diagram illustrating a further alternative use case of the system shown in FIG. 1.

FIG. 6 is a plan view of a further use case for the system 10 installed on an excavator 100 to identify objects 102 in an exclusion zone. In this embodiment, the system 10 includes the processing unit 23, including the communications module 20, secured within the cab 106 of the excavator 100, two cameras 15 secured to the rear and side of the excavator 100 and in communication with the processing unit 23, and two alert devices 19, one worn by a driver of the excavator 100 and the other worn by a worker 103 working near the excavator 100, both devices 16 being in communication with the processing unit 23. The processor 22 is configured so that the defined object category 12 is people. Responsive to communicating with the cameras 15, via the communications module 20, the processor 22 has determined the collective range of both cameras 15 define a sensing zone 108 extending across the side and rear end of the excavator 100, approximately corresponding with a movement radius of the excavator's 100 bucket 110. Responsive to communicating with the alert devices 19, the processor 22 has registered both devices 19 with the sensing zone 108.

As shown in FIG. 6, when a person 102 is within the sensing zone 108, the processor 22 identifies the person 102 as the defined object, causing the processor 22 to communicate an alert signal, via the communications module 20, to each alert device 19. Each alert device 19 consequently emits a vibration pattern, signalling to the driver to cease moving the bucket 110, reducing the risk of the bulldozer 92 colliding with the person 102, and signalling to the worker 103 that there is a person 102 within the exclusion zone, allowing the worker 103 to remove the person 102, if required.

Figure 7:
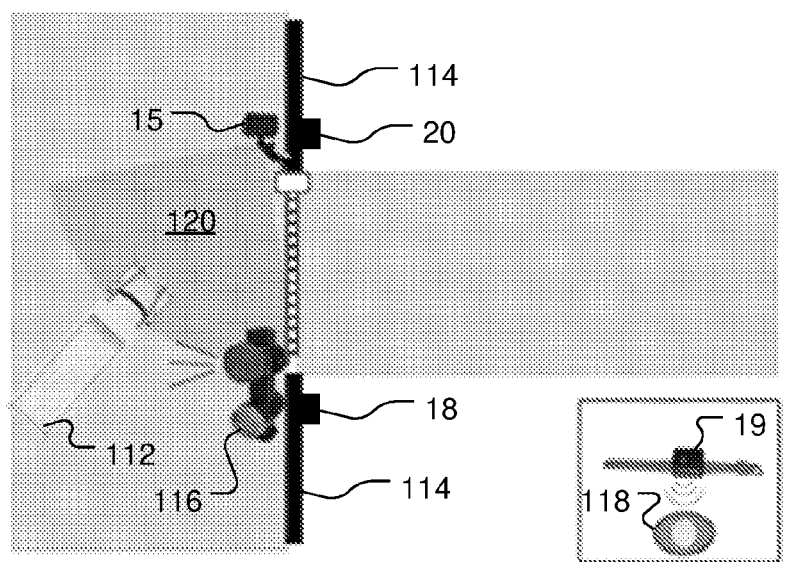
FIG. 7 is a plan view diagram illustrating a further alternative use case of the system shown in FIG. 1.

FIG. 7 is a plan view of a further use case for the system 10 installed at a gate 110 to identify objects 112 in a restricted access zone. In this embodiment, the system 10 includes the communications module 20 in communication with a remotely located processer 22 (not illustrated), the module 20 associated a camera 15 secured to a fence 114 flanking the gate 110, and also in communication with two alert devices 18, 19, one (18) being secured to the fence 114 and operationally connected to a traffic light 116 and the other worn by a security guard 118 located remotely from the gate 110. The range 16 of the camera 15 is directed across an entry to the gate 110. The processor 22 is configured so that the defined object categories 12 are non-authorised vehicles and non-authorised people. Responsive to communicating with the camera 15, via the communications module 20, the processor 22 has determined the range of the camera 15 defines a sensing zone 120. Responsive to communicating with the alert devices 18, 19, the processor 22 has registered both devices 18, 19 with the sensing zone 120.

As shown in FIG. 7, when a non-authorised vehicle 112 is within the sensing zone 120, the processor 22 identifies the vehicle 112 as the defined object, causing the processor 22 to communicate an alert signal, via the communications module 20, to each alert device 18, 19. The fence-mounted alert device 18 consequently operates one or more of the connections 183 to control operation of the traffic light 84. This signals to a driver of the vehicle 112 to cease driving. The wearable alert device 19 consequently emits a vibration pattern, signalling to the security guard 118 to attend the gate 110 to determine if the vehicle 112 should enter the restricted entry zone. It will be appreciated that, depending on the location of security guard 118, the system 10 may include a further communications module (not shown) to facilitate communication of the alert signal to the wearable alert device 19, potentially via the Internet.

Figure 8:
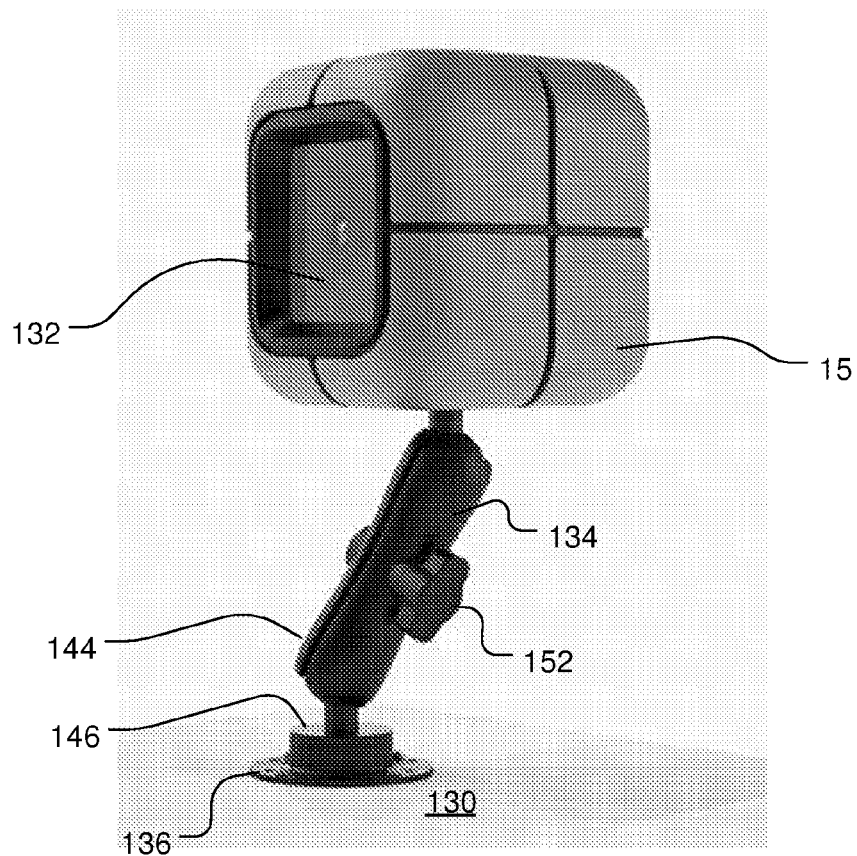
FIG. 8 is a perspective view of a camera which forms part of the system shown in FIG. 1.
Figure 9:
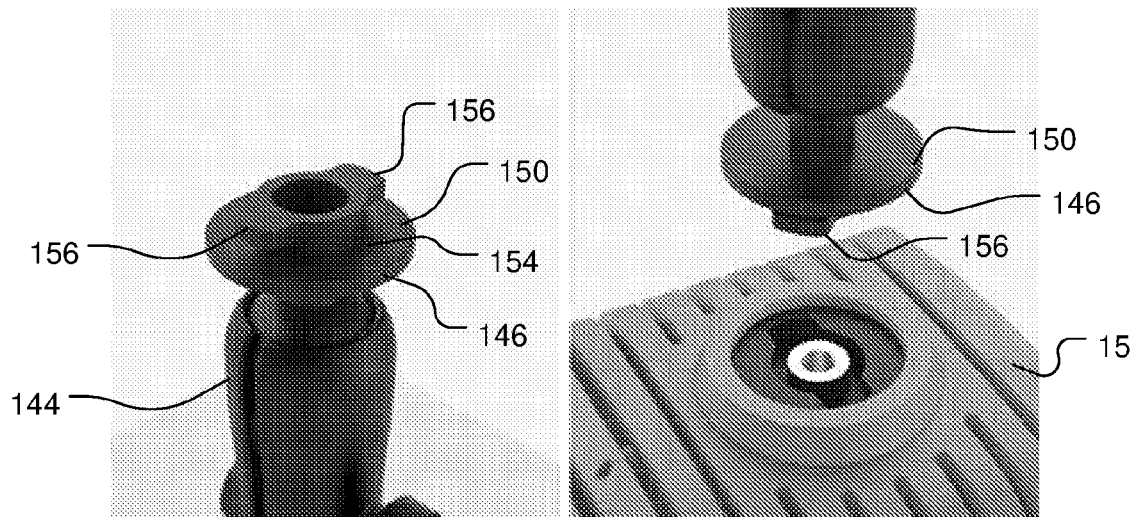
FIGS. 9 to 14 are perspective views of a mount assembly for mounting the camera shown in FIG. 8 to a structure.

FIG. 8 is a perspective view of one of the sensors 14 for sensing environmental information, configured as a camera 15. The sensor 14 includes a sensing unit, in the illustrated embodiment in the form of an imaging assembly 130 including a lens 132 and image sensor (not illustrated). The imaging assembly 130 defines a detection range within which the environmental information is sensed. The sensor 14 also includes a memory store (not illustrated) storing identification and/or authorisation information, a processor (not illustrated) communicatively connected to the memory store, and a communications module (not illustrated) configured to communicate sensed one or more of the environmental information, the identification information and the authorisation information. The camera is secured to a structure 130 by a mount assembly 134, as discussed in greater detail below.

FIGS. 9 to 14 are perspective views of aspects of the mount assembly 134. The assembly 134 includes a plurality of bases 136, 138, 140 and an arm 144 securable to each base 136, 138, 140. Each base 136, 138, 140 is configured to be releasably secured to the structure 130, and defines a first (base) bayonet fitting 142. The arm 144 includes a base connector 146 defining a second (arm) bayonet fitting 148 configured to engage the first bayonet fitting 142, and a camera connector 150 configured to engage the camera 15. The camera connector 150 is movable relative to the base connector 146. A locking mechanism 152 is operable to releasably secure the base connector 146 and the camera connector 150 in position relative to each other.

The arm bayonet fitting 148 defines a shaft 154 having at least one flange 156 extending away from the shaft 154. In the embodiment shown, a pair of opposed flanges 156 extend at a free end of the shaft 154. The base bayonet fitting 142 defines a recess 143 shaped to receive the at least one flange 156 and allow at least partial rotation of the flange 156 about an axis of the shaft 154. The base bayonet fitting 142 also defines an aperture 158 into the recess 143, the aperture 158 shaped to allow the at least one flange 156 and the shaft 154 to pass into the recess 143. In the embodiment shown, the aperture 158 defines a slot extending from a circular hole. It will be appreciated that the configuration of the bayonet fittings 148, 142 can be reversed, so that the arm bayonet fitting 148 defines the recess 143 and aperture 158, and the base bayonet fitting 142 defines the shaft 154 and flanges 156.

The camera connector 150 is identical to the base connector 148 and therefore also includes the bayonet fitting 148 comprising the shaft 154 and a pair of opposed flanges 156 extending from a free end of the shaft 154.

Figure 10:
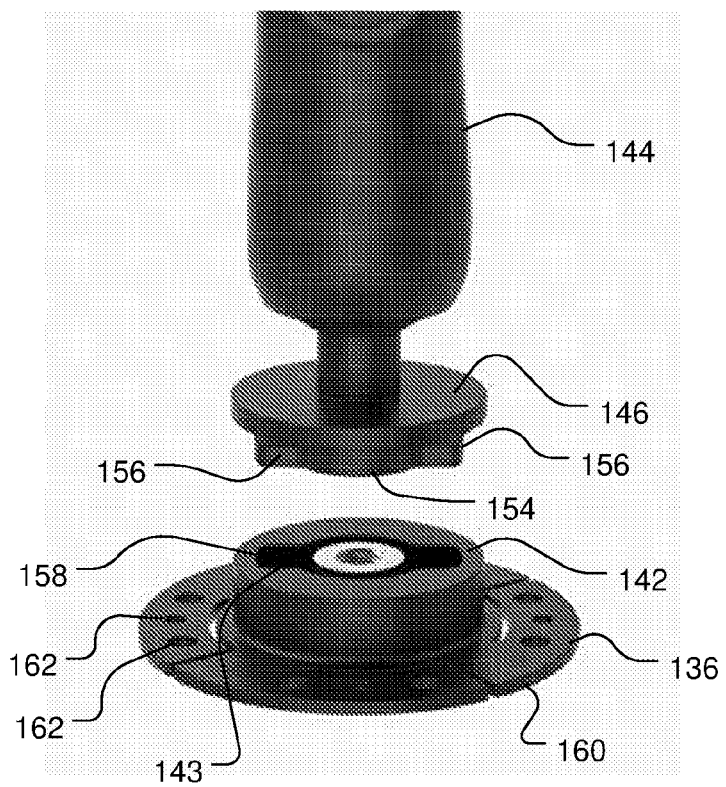
Figure 11:
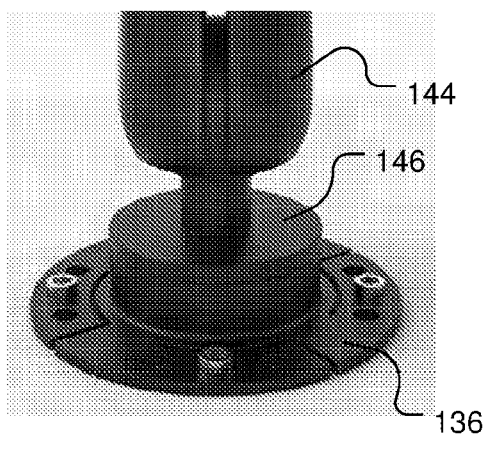
Figure 12:
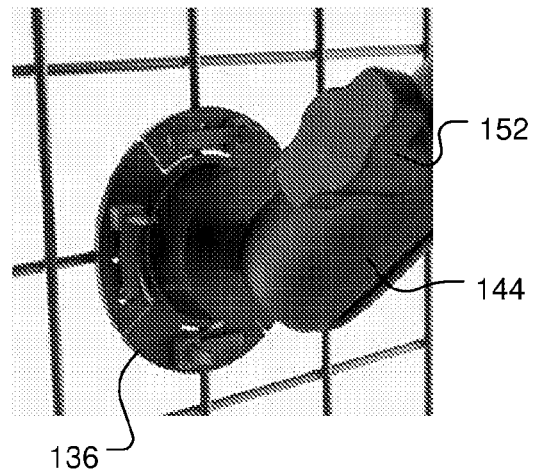

FIGS. 10 to 12 show a fastener mount 136 defining the base bayonet fitting 142 and a flange 160 extending from the fitting 142. The flange 160 defines an array of apertures 162 dimensioned to receive fasteners. At least some of the apertures 162 are dimensioned to receive screws (FIG. 11) and some of the apertures 162 are dimensioned to receive looped cables or ties (FIG. 12).

Figure 13:
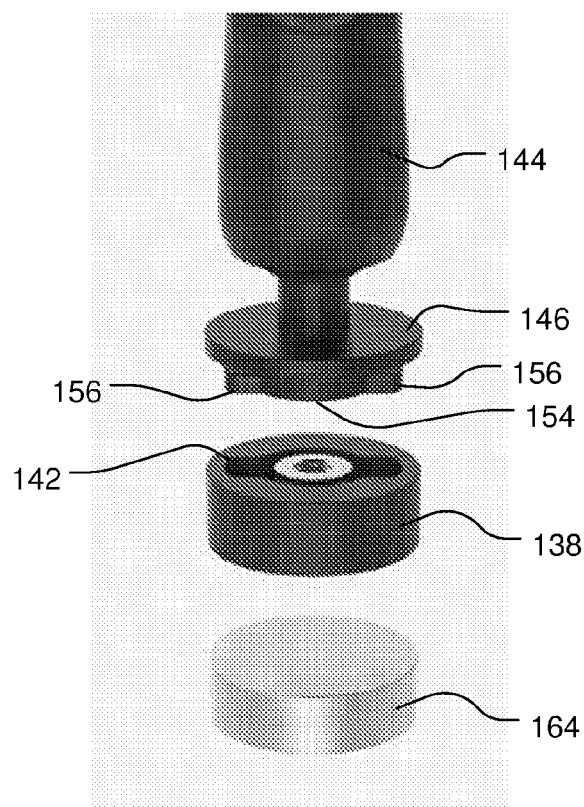

FIG. 13 shows a magnet mount 138 defining the base bayonet fitting 142 and connected to a magnet 164. In the embodiment shown, the magnet mount 138 includes a recess (not visible) shaped to receive and retain the magnet 164.

Figure 14:
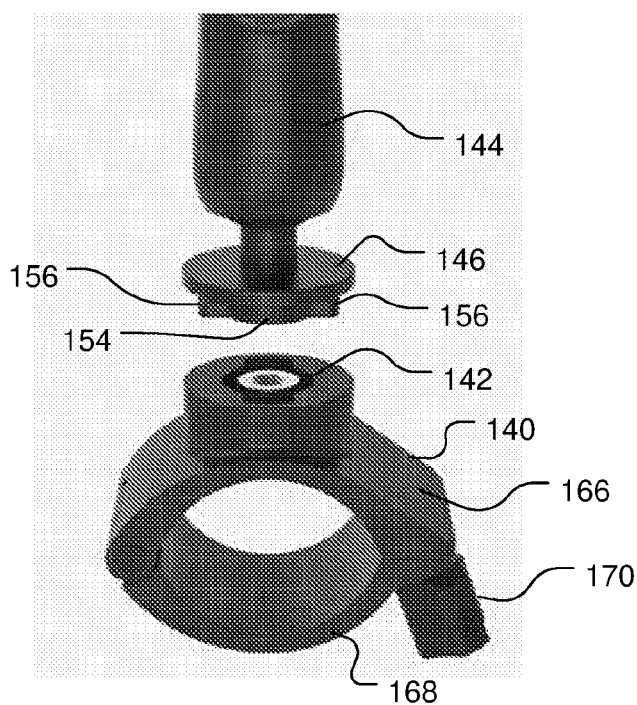

FIG. 14 shows a clamp mount 140 defining the base bayonet fitting 142 and a pair of opposable jaws 166, 168 connected to the fitting 142. In the embodiment shown, one of the jaws 166 is integrally formed with the fitting 142. The clamp mount 140 includes an actuator 170 operable to urge the jaws 166, 168 together.

Figure 15:
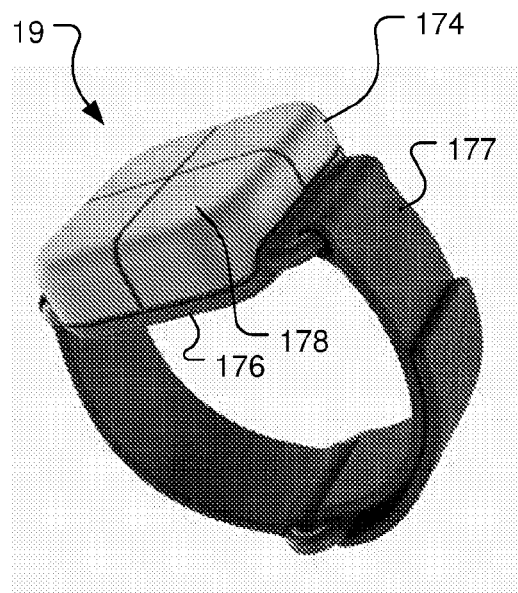
FIGS. 15 to 18 are perspective views of two configurations of an alert device which forms part of the system shown in FIG. 1.
Figure 16:
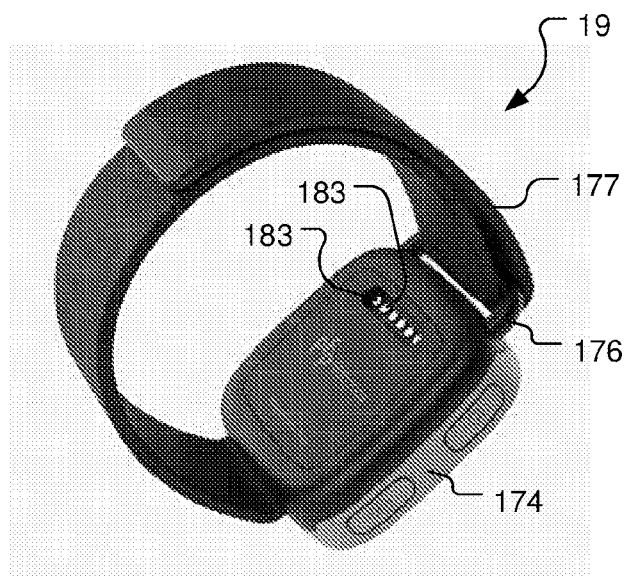
Figure 17:
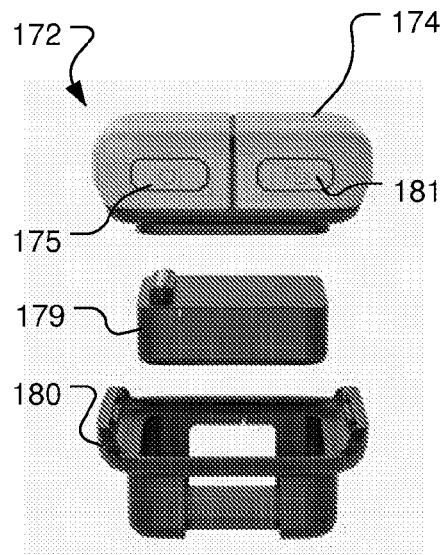

FIGS. 15 to 17 are perspective views of two configurations of the alert device 18, being the wearable configuration 19 and a surface-mounted configuration 172. The alert device 18 includes an alert generator (not illustrated) configured to cause the alert to be emitted, a memory store (not illustrated) storing identification and/or authorisation information, a processor (not illustrated) communicatively connected to the memory store, and a communications module (not illustrated) configured to communicate one or more of the identification information and the authorisation information, and receive an alert signal to cause operation of the alert generator to emit the alert.

FIGS. 15 and 16 show the alert device 18 configured as the wrist-watch style wearable device 19. The device 19 includes a module 174 housing a battery (not illustrated), vibrator (not illustrated), a light 178, the processor (not illustrated), memory store (not illustrated), the electrical connections 183 and communications module (not illustrated). A power button 175 and connectivity button 181 (FIG. 16) are connected to or otherwise defined by the housing 174. The module 174 is releasably retained in a frame 176, in the embodiment shown by a snap-clip arrangement. A strap 177 is secured to the frame 176, the strap 177 being releasably securable about a user's limb. It will be appreciated that the wrist-watch style device 19 is exemplary only and that the alert device 18 may be embodied in other wearable forms, such as a hardhat, and be configured to deliver alternative alerts, such as a brim of the hardhat illuminating.

Figure 18:
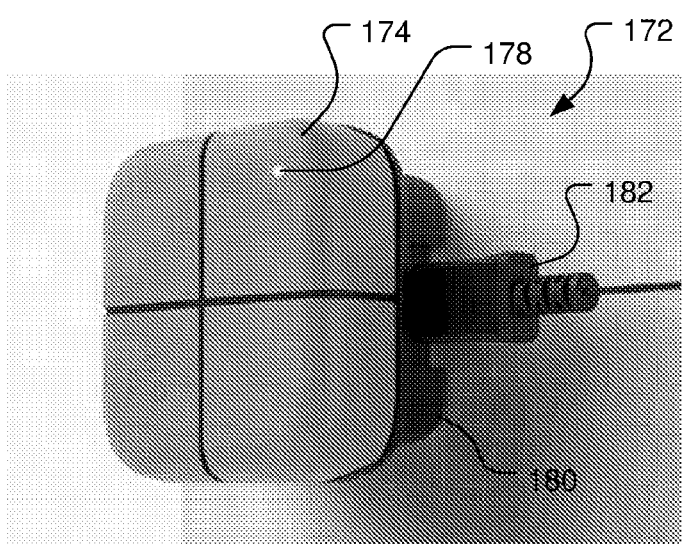

FIGS. 17 and 18 show the alert device 18 configured as a surface-mounted device 172. In this configuration, the module 174 is connected to a power supply 179 via the electrical connectors 183 and releasably retained in an alternative frame 180. The frame 180 is securable to a surface by mechanical, magnetic and/or adhesive means. FIG. 17 shows a cable 182 connected to the power supply 179 to facilitate power and data transmission. The cable 182 may be connected directly to another device, such as the traffic light 84, to allow the alert device 172 to control operation of the other device, or may be connected to a network, including the Internet, to enable control of a remotely located device.

Use of the system 10 involves installing, typically by fixedly securing, the processing unit 23 and/or the control module 20 at a first location, installing, typically by fixedly securing, the cameras 15 at second locations, and securing each wearable alert device 19 to a user and/or fixedly securing each surface-mounted alert device 172 to a third location. Each of the first, second and third locations may be fixed or on a portable structure, such as a vehicle or heavy machinery.

The system 10 is powered, allowing the system 10 to establish communication between each camera 15 and alert device 19, 172 within range of the communications module 20 and/or a further communications module 21. A first stage of communication, between the cameras 15 and the communications modules 20, 21, allows the processor(s) 22 to determine one or more sensing zones 24. A second stage of communication, between the alert devices 19, 172 and the communications modules 20, 21, allows the processor(s) 22 to determine which of the alert devices 19, 172 to register with the, or each, sensing zone 24. For example, it may be determined that one alert device 19 should be registered with a single zone 24 ("fixed configuration") whereas another alert device 19 should be registered with multiple (or all) zones 48, 50 ("roaming configuration").

It will be appreciated that the first and second stages of communication may be frequently repeated to allow the processor(s) 22 to reconfigure the sensing zone(s) 24 and registration of the alert devices 19, 172 with each zone 24. For example, the system 10 may be configured to execute at least the first stage at a defined interval. Alternatively, the first stage may be executed due to relative movement of a camera 15 and the communications module 20 resulting in the camera 15 being within communication range of the communications module 20 thereby allowing the processor(s) 22 to receive a ping from the camera 15.

When a sensing zone(s) 24 is determined, the operator, operating the controller 26, may define other functions of the system 10 to be associated with the zone 24, for example, manually configuring the boundary of the zone 24 and/or defining a specific alert, such as a vibration pattern, to be emitted by the alert device(s) 19 registered with the zone 24.

The system 10 operates to continuously monitor each defined sensing zone 24 to identify the one or more defined objects 12 associated with the respective zone 24. This is achieved by continuously or periodically communicating sensed environmental information from each camera 15 associated with a sensing zone 24 to the one or more processors 22. The processor(s) 22 then assesses the sensed information to identify the defined object(s) (12). When the defined object(s) 12 is identified, an alert signal is communicated from the processor(s) 22 to each alert device 19, 172 registered to the zone 24, causing the registered alert device(s) 19, 172 to emit the alert. Emitting the alert prompts the user(s) to take action, such as reacting to avoid injury and/or damage to property.

Use of the mount assembly 134 involves installing one of the bases 136, 138, 140 to a structure 130, engaging the camera connector 150 with the camera 15, inserting the flanges 156 of the arm bayonet fitting 148 into the aperture 148 of the base bayonet fitting 142 and rotating the arm 144 to engage the arm 144 with the base 136, 138, 140. Releasing the locking mechanism 154 allows a position of the camera connector 150 relative to the base connector 146 to be adjusted, consequently allowing the range 16 of the camera 15 to be directed towards an area/volume of interest.

The system 10 provides a "living device mesh" where the sensors 14, alert devices 18 and processors 22 are interchangeable according to usage requirements and/or circumstances. This allows the system 10 to dynamically adapt and self-organise. This means that the system 10 is useful for a wide range of applications, including high-value, critical operations such as workplace health and safety, or security.

The system 10 is configured to automate establishing one or more sensing zones 24, associating relevant users, via alert devices 18, with the one or more sensing zones 24, monitor the one or more sensing zones 24 for the presence of one or more defined objects 12 and, subject to identifying the object(s) 12, alerting the users. This advantageously allows users to respond to the alert, for example, to avoid injury, damage to property, unauthorised access, and/or improve task efficiency.

The system 10 is configured to allow 'roaming' of any alert device 18, sensor 14 and communications module 20, 21. This means that the sensing zones 24 are fluid, able to be expanded/contracted in response to connectivity to sensors 14, therefore allowing sensing zone 24 area/volume and location to be optimised, potentially corresponding with a specific task. This also means that communication of alerts to users is dynamic, able to be adjusted in response to an alert device 18 being registered with one or more specific zones 24, therefore optimising when the user is alerted and what type of alert is communicated to the user, potentially also corresponding with a specific task.

Similarly, the system 10 is configured to allow roaming of the controller 26. This means that the object(s) 12 being identified in a sensing zone 24 can be adjusted in response to connectivity to the controller 26, potentially also corresponding with a specific task.

The roaming functionality of the processing unit 23, for example, by installing the unit 23 in a vehicle, can optimise cost-effectiveness of the system 10, as this allows a network of inexpensive sensors 14 to be installed across a potentially large region and a single, expensive processing unit 23 to roam between and connect to the sensors 14 to temporarily establish a sensing zone 24 local to the processing unit 23 as required. This means that the number of processing units 23 necessary to monitor a potentially large area is minimised, reducing cost of the system 10. This also means that installation of the system 10 across a potentially large area requires little planning, as the inexpensive sensors 14 can be generously scattered across the area to be monitored and be operationally organised by the system 10 during use (to form required sensing zones 24), meaning that installation of the system 10 is simple, quick and, consequently, cost-effective.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for identifying one or more defined objects and alerting a user, the system comprising:
   a controller operable by the user to define the one or more defined objects by operating interface elements representing the one or more defined objects;
   a plurality of cameras, each camera having an imaging assembly configured to define a detection range within which environmental information is sensed, and each camera operable to record video footage of events occurring within the detection range;
   a plurality of alert devices, each alert device configured to emit an alert; and
   a processing unit including at least one processor, at least one memory store, and a communications module communicatively connected to the controller, the plurality of cameras, the plurality of alert devices, and the at least one processor, the communications module configured to facilitate communication between the processing unit and any of the plurality of cameras and the plurality of alert devices, the processing unit being arrangeable locally to the plurality of cameras to allow the video footage to be processed in situ to a defined sensing zone,
   the at least one processor being trained via multiple training processes and/or a feedback loop to recognise different objects in video footage, and the at least one processor configured to assess the video footage recorded by the plurality of cameras to identify the one or more defined objects represented in the video footage, and further configured so that:
      responsive to receiving identification and/or authorisation information from the plurality of cameras, define a first sensing zone having a boundary equal to or less than the detection range of one or more of the plurality of cameras;
      determine one or more of the plurality of alert devices to register with the first sensing zone; and
      responsive to receiving the video footage recorded by the one or more of the plurality of cameras associated with the first sensing zone, and determining the one or more defined objects are present in the video footage and, consequently, within the first sensing zone, communicate an alert signal associated with the first sensing zone to, the one or more of the plurality of alert devices registered with the first sensing zone to cause only the one or more registered alert devices to emit the alert.

2. The system according to claim 1, wherein responsive to communicating with the plurality of cameras, the at least one processor determines at least one of: which of the plurality of cameras are authorised to be associated with the first sensing zone; and which of the plurality of cameras are less than a first defined distance away from the processing unit, thereby allowing defining the first sensing zone.

3. The system according to claim 1, wherein responsive to communicating with the plurality of alert devices, the at least one processor determines at least one of: which of the plurality of alert devices are authorised to register with the first sensing zone; and which of the plurality of alert devices are less than a second defined distance away from the processing unit, thereby determining registration of at least one of the plurality of alert devices with the first sensing zone.

4. The system according to claim 1, wherein at least one of the plurality of cameras, the plurality of alert devices, and the processing unit are movable relative to each other.

5. The system according to claim 4, wherein the processing unit and at least one of the plurality of cameras are movable relative to each other, and wherein the at least one processor is configured to continuously or periodically communicate with the plurality of cameras to allow reconfiguring the first sensing zone responsive to confirming which of the plurality of cameras are less than a third defined distance away from the processing unit.

6. The system according to claim 4, wherein the processing unit and at least one of the plurality of alert devices are movable relative to each other, and wherein the processing unit is configured to continuously or periodically communicate with the alert devices to allow re-determining which of the plurality of alert devices to register with the first sensing zone responsive to confirming which of the plurality of alert devices are less than a fourth defined distance away from the processing unit.

7. The system according to claim 1, including a further processing unit in communication with the plurality of cameras and the plurality of alert devices, wherein the further processing unit is configured so that:
   responsive to receiving identification and/or authorisation information from the plurality of cameras, define a second sensing zone having a boundary equal to or less than the detection range of at least one of the plurality of cameras;
   determine at least one of the plurality of alert devices to register with the second sensing zone; and
   responsive to receiving the environmental information sensed by the at least one of the plurality of cameras associated with the second sensing zone and determining the one or more defined objects are within the second sensing zone, communicate a second alert signal associated with the second sensing zone to the at least one alert device registered with the second sensing zone to cause only the at least one registered alert device to emit the alert.

8. The system according to claim 7, wherein at least one of the plurality of alert devices is movable relative to both of the processing units to cause registration with the sensing zone associated with a most closely located processing unit.

9. The system according to claim 8, wherein the at least one movable alert device is further configured to require authorisation from the user before registration with any sensing zone.

10. The system according to claim 7, wherein at least one of the plurality of cameras is movable relative to both processing units to cause association with the sensing zone associated with a most closely located processing unit, thereby increasing a collective range of the cameras associated with the sensing zone.

11. The system according to claim 7, wherein the controller is operable to associate one or more first defined objects with the first sensing zone, and one or more second defined objects with the second sensing zone.

12. The system according to claim 11, wherein responsive to receiving, from the controller, data relating to alert device configuration, the processing units are configured to cause the one or more of the plurality of alert devices registered with the first sensing zone to cause emitting a first alert, and the at least one of the plurality of alert devices registered with the second sensing zone to cause emitting a second alert, and wherein the first alert and the second alert are discernible from each other by the user.

13. The system according to claim 7, wherein the controller is operable to configure either sensing zone to define an area of less than the detection range of the one or more of the plurality of cameras associated with that sensing zone.

14. A method for identifying one or more defined objects with a processing unit comprising at least one processor and a memory storage, where the processing unit is arranged locally to a plurality of cameras to allow video footage recorded by the plurality of cameras to be processed in situ, the method including:
    operating the at least one processor to be trained via multiple training processes and/or a feedback loop to recognise different objects in the video footage such that the at least one processor is configured to assess the video footage recorded by the plurality of cameras to identify the one or more defined objects represented in the video footage;
    operating a controller to define the one or more defined objects by operating interface elements representing the one or more defined objects;
    operating the plurality of cameras to define a detection range within which environmental information is sensed;
    providing a plurality of alert devices where each alert device is configured to emit an alert;
    communicating, by the at least one processors, with the plurality of cameras and the plurality of alert devices to receive identification and/or authorisation information and, consequently, determine a sensing zone having a boundary equal, to or less than, the detection range of one or more of the plurality of cameras, and
    determine which of the plurality of alert devices to register with the sensing zone;
    recording, with the plurality of cameras, the video footage of events occurring within the sensing zone, and communicating the video footage to the at least one processor;
    determining, by the at least one processors, whether the one or more defined objects are present in the video footage, and consequently, within the sensing zone;
    responsive to determining the one or more defined objects are within the sensing zone, communicating, by the at least one processor, an alert signal to the, or each, alert device registered with the sensing zone; and
    emitting, by only the, or each, registered alert device, an alert.

* * * * *